United States Patent
Zhang et al.

(10) Patent No.: US 9,118,466 B2
(45) Date of Patent: Aug. 25, 2015

(54) METHOD, DEVICE AND SYSTEM FOR BACKHAUL LINK COMMUNICATION IN A TDD SYSTEM

(75) Inventors: Wenjian Zhang, Beijing (CN); Xueming Pan, Beijing (CN); Libo Wang, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 800 days.

(21) Appl. No.: 13/265,899

(22) PCT Filed: Apr. 20, 2010

(86) PCT No.: PCT/CN2010/071924
§ 371 (c)(1),
(2), (4) Date: Dec. 6, 2011

(87) PCT Pub. No.: WO2010/121539
PCT Pub. Date: Oct. 28, 2010

(65) Prior Publication Data
US 2012/0069778 A1     Mar. 22, 2012

(30) Foreign Application Priority Data

Apr. 24, 2009  (CN) .......................... 2009 1 0082699
Aug. 13, 2009  (CN) .......................... 2009 1 0091200

(51) Int. Cl.
| | |
|---|---|
| H04L 5/14 | (2006.01) |
| H04W 72/04 | (2009.01) |
| H04L 1/18 | (2006.01) |
| H04L 1/00 | (2006.01) |
| H04W 28/04 | (2009.01) |
| H04W 84/04 | (2009.01) |

(52) U.S. Cl.
CPC ............... *H04L 5/14* (2013.01); *H04W 72/042* (2013.01); *H04L 1/1812* (2013.01); *H04L 2001/0097* (2013.01); *H04W 28/04* (2013.01); *H04W 84/047* (2013.01)

(58) Field of Classification Search
None
See application file for complete search history.

(56) References Cited

U.S. PATENT DOCUMENTS

2008/0045144 A1*  2/2008  Fujita ................................ 455/7
2009/0181689 A1*  7/2009  Lee et al. ...................... 455/450

FOREIGN PATENT DOCUMENTS

| CN | 1929334 | 3/2007 |
|---|---|---|
| CN | 101064555 A | 10/2007 |
| CN | 101141171 A | 3/2008 |

OTHER PUBLICATIONS

International Search Report for International Application No. PCT/CN2010/071924 dated Jul. 7, 2010.

*Primary Examiner* — Khao Huynh
(74) *Attorney, Agent, or Firm* — Duane Morris LLP

(57) ABSTRACT

The present invention provides a method, device and system for backhaul link communication in a TDD system. Wherein, the method includes: a base station allocating an uplink subframe for uplink transmitting of the backhaul link and a downlink subframe for downlink transmitting of the backhaul link, and notifying subframe allocating information to a relay node; and the base station communicating with the relay node by the uplink subframe and the downlink subframe of the backhaul link. The solution allocates the uplink subframe and the downlink subframe of the backhaul link according to certain rules, performs related HARQ operation based on the allocated uplink subframe and downlink subframe, and ensures the availability and reliability of backhaul link communication.

16 Claims, 15 Drawing Sheets

Fig. 4A

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| DL | D | S | U | U | D | D | S | U | U | D | D | S | U | U | D | D | S | U | U | D |
| UL |   |   |   |   | 4 |   |   |   | A |   |   |   |   |   | 4 |   |   |   |   |   |
|    |   |   |   |   |   |   |   |   | 8 |   |   |   |   |   | G |   |   |   |   |   |

Fig. 4B

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| DL | D | S | U | U | D | D | S | U | U | D | D | S | U | U | D | D | S | U | U | D |
| UL |   |   |   | 3 |   |   |   |   |   | 9 |   |   |   | A |   |   |   |   |   | 9 |
|    |   |   |   |   |   |   |   |   |   | G |   |   |   | 3 |   |   |   |   |   |   |

| 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|
| D | S | U | D | D | D | S | U | D | D | D | S | U | D | D | D | S | U | D | D |

DL: 3 at position 3, A at position 7, 3 at position 13
UL: 7 at position 7, G at position 13

Fig. 5E

| 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|
| D | D | D | S | U | D | D | D | S | U | D | D | D | S | U | D | D | D | S | U | D | D | D | S | U | D | D | D | S | U |

| 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|
| D | S | U | U | U | D | S | U | U | D | D | S | U | U | U | D | S | U | U | D |
|   | DL |   |   | 4 |   |   |   |   | 9 |   |   |   |   | A |   |   |   |   | 9 |
|   | UL |   |   |   |   |   |   |   | G |   |   |   |   | 4 |   |   |   |   |   |

Fig. 8

METHOD, DEVICE AND SYSTEM FOR BACKHAUL LINK COMMUNICATION IN A TDD SYSTEM

TECHNICAL FIELD

The present invention relates to the technical field of radio communication, and especially, to a method, device and system for backhaul link communication in a TDD (Time Division Duplexing) system.

BACKGROUND ART

LTE (Long Term Evolution) systems are an evolution of the 3G (3rd Generation), which improves and enhances the air access technology of the 3G and uses OFDM (Orthogonal Frequency Division Multiplexing) and MIMO (Multiple Input Multiple Output) as a unique standard of the evolution of radio networks. Wherein, the LTE can provide a peak rate of downlink 100 Mbit/s and uplink 50 Mbit/s in a bandwidth of 20 MHz, which improves performance of cell edge users, expands cell capacity and lowers system delay.

There is not any relay node in existing LTE systems, the frame structure in a TDD mode in the LTE specification is shown in FIG. 1. For the frame structure of the LTE TDD, each 10 ms radio frame comprises two half-frames, and each half-frame comprises 51 ms subframes, wherein, each subframe can be divided into two 0.5 ms ordinary timeslots or three special timeslots DwPTS (Downlink Pilot Timeslot), and Guard Period GP and UpPTS (Uplink Pilot Timeslot) constitute a special subframe (S). In the existing specification, subframe 0 of the frame structure in the TDD mode is a downlink subframe, and the synchronization signal and the non-scheduling broadcasting signal of the radio frame are both in the subframe; considering the switching between the uplink and downlink, subframe 2 is in the uplink subframes.

Specifically, the two 5 ms half-frames in one radio frame can be two identical half-frame structures (that is, a frame structure with 5 ms as a period), in which, the configurations of uplink and downlink timeslots comprise: 1DL:3UL; 2DL:2UL; 3DL:1UL, and etc.

In addition, considering the utilization rate of radio resources and the compatibility among different frame structures, the two 5 ms half-frames can be different frame structures (that is, a frame structure with 10 ms as a period), and one of the half-frame structures has a special timeslot (S) of 1 ms, for the other half-frame structure, the 5 ms special timeslot can be flexibly configured as an uplink and downlink data timeslot, and in this frame structure, the configurations of uplink and downlink timeslots comprise: 6DL:3UL; 7DL:2UL; 8DL:1UL, 3DL:5UL, and etc. Configurations of uplink and downlink frame structures are shown in table 1.

TABLE 1 uplink and downlink configurations of a TDD frame structure

| Uplink and downlink configurations | Period of uplink and downlink switching point | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In an LTE-A system, an RN (Relay Node) will be introduced, which has features comprising, but not limited to, that: the RN, by controlling cells, make each cell be an independent cell and have an additional physical cell ID for the user equipment UE, and the RN will send information such as the synchronization channel and reference symbol, etc.

Currently, the introduction of the relay node renders three radio links of mobile communication systems based on a repeater: a direct link of eNB-macro UE, a backhaul link of eNB-RN, and an access link of RN-relay UE. Considering signal interference restriction in radio communication, the three links need to use orthogonal radio resources. As the transceiver of the relay node is in a TDD mode, the backhaul link and the access link occupy different timeslots in the TDD frame structure, but the direct link and the backhaul link can coexist, as long as their time frequency resources are orthogonal.

However, the current LTE specification does not define the transmission frame structure of the backhaul link between the eNB and the RN or related HARQ (Hybrid Auto Repeat Request) operation, and eNB and the RN cannot have effective and reliable communication in the backhaul link, thus it is necessary to define the transmission frame structure of the backhaul link and the related HARQ operation, so as to ensure the effectiveness and reliability of communication in the backhaul link.

SUMMARY OF THE INVENTION

The present invention provides a method, device and system for backhaul link communication in a TDD system.

According to one aspect of the present invention, a method for backhaul link communication in a TDD system is provided, and the method includes: a base station eNB allocating an uplink subframe for backhaul link uplink transmitting and a downlink subframe for backhaul link downlink transmitting, and notifying subframe allocating information to a relay node RN; and the eNB communicating with the RN by the uplink subframe and the downlink subframe of a backhaul link.

Wherein, the eNB communicating with the RN by the uplink subframe and the downlink subframe of the backhaul link comprises: the eNB receives the uplink data and/or uplink ACK (ACKnowledge Character)/NACK (Negative ACKnowledgement) feedback sent from the RN in the uplink subframe of the backhaul link; and the eNB sends downlink data and/or uplink scheduling information to the RN in the downlink subframe of the backhaul link.

According to another aspect of the present invention, a method for backhaul link communication in a TDD system is provided, and the method includes: an RN receives allocating information of uplink subframes and downlink subframes of a backhaul link sent from an eNB and determines the corresponding uplink subframes and downlink subframes of the backhaul link; and the RN communicates with the eNB by the uplink subframe and the downlink subframe of the backhaul link.

Wherein, the RN communicating with the eNB by the uplink subframe and the downlink subframe of the backhaul link comprises: the RN sends uplink data and/or uplink ACK/NACK feedback to the eNB in the uplink subframe of the backhaul link; and the RN receives downlink data and/or uplink scheduling information sent from the eNB in the downlink subframe of the backhaul link.

According to another aspect of the present invention, a relay device is provided, comprising: a receiving module configured to receive subframe allocating information of uplink subframes for uplink transmission of the backhaul link and downlink subframes for downlink transmission of the backhaul link from an eNB; a determining module configured to determine the uplink subframes and the downlink subframes of a backhaul link according to the subframe allocating information; and a communicating module configured to communicate with the eNB by the uplink subframes and downlink subframes of the backhaul link.

According to another aspect of the present invention, a base station eNB is provided, comprising: an allocating module configured to allocate uplink subframes for uplink transmission of the backhaul link and downlink subframes for downlink transmission of the backhaul link; a sending module configured to notify an RN of subframe allocating information; and a communicating module configured to communicate with the RN by the uplink subframes and downlink subframes of a backhaul link.

According to still another aspect of the present invention, a system for backhaul link communication in a TDD system is provided, comprising an eNB and an RN, wherein, the eNB allocates uplink subframes for uplink transmission of the backhaul link and downlink subframes for downlink transmission of the backhaul link and notifies the RN of subframe allocating information, the RN receives the subframe allocating information and determines corresponding uplink subframes and downlink subframes of a backhaul link, and communicates with the eNB by the uplink subframes and downlink subframes of a backhaul link.

Compared with the prior art, the present invention at least comprises the following advantages: allocating the uplink subframes and downlink subframes of the backhaul link according to certain rules ensures effective communication between the eNB and the RN in the backhaul link and will not affect the transmission performance of the access link; conducting related HARQ operation based on the allocated backhaul link subframes would enable retransmission of incorrectly transmitted downlink data and downlink data, which ensures the reliability of backhaul link communication.

BRIEF DESCRIPTION OF ACCOMPANYING DRAWINGS

To more clearly describe the technical solutions of the present invention, accompanying drawings that are needed for describing embodiments will be briefed hereinafter. Obviously, the accompanying drawings in the following description are only some embodiments of the present invention, and one skilled in the art could obtain other accompanying drawings based on such accompanying drawings without ingenuity work.

In all embodiments of the present invention, D in the accompanying drawings represents subframes in the access link for downlink transmission. U in the accompanying drawings represents subframes in the access link for uplink transmission. S in the accompanying drawings represents special subframes in LTE TDD systems. And the special subframes comprise DwPTS, UpPTS, GP and etc. A represents uplink ACK/NACK feedback. G represents uplink scheduling information. And subframes marked with numbers represent backhaul link subframes sending uplink data and downlink data. It should be explained that uplink subframes all represent subframes at the RN side.

Figures 4C, 4D:
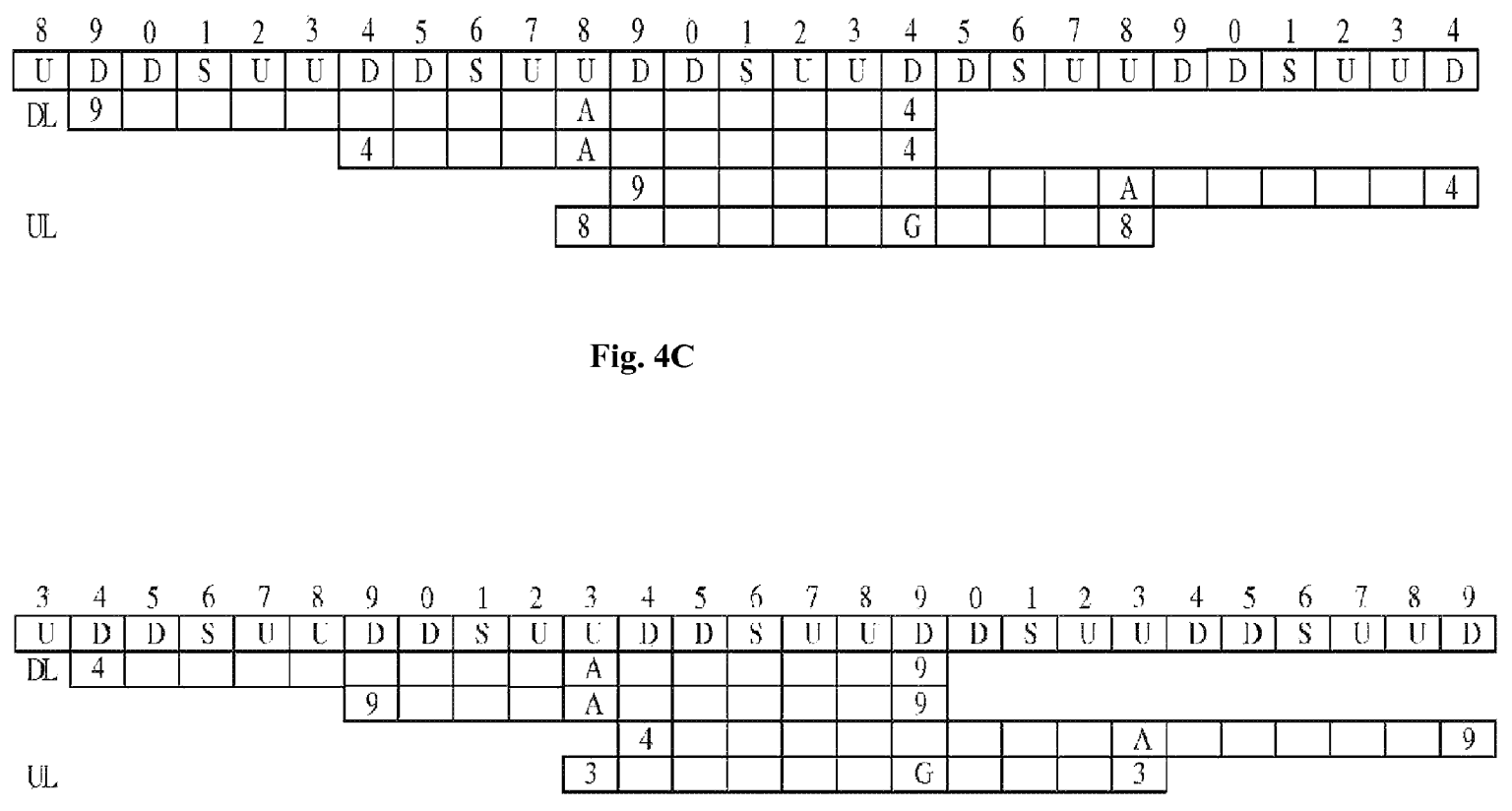
Figures 4E, 5A:
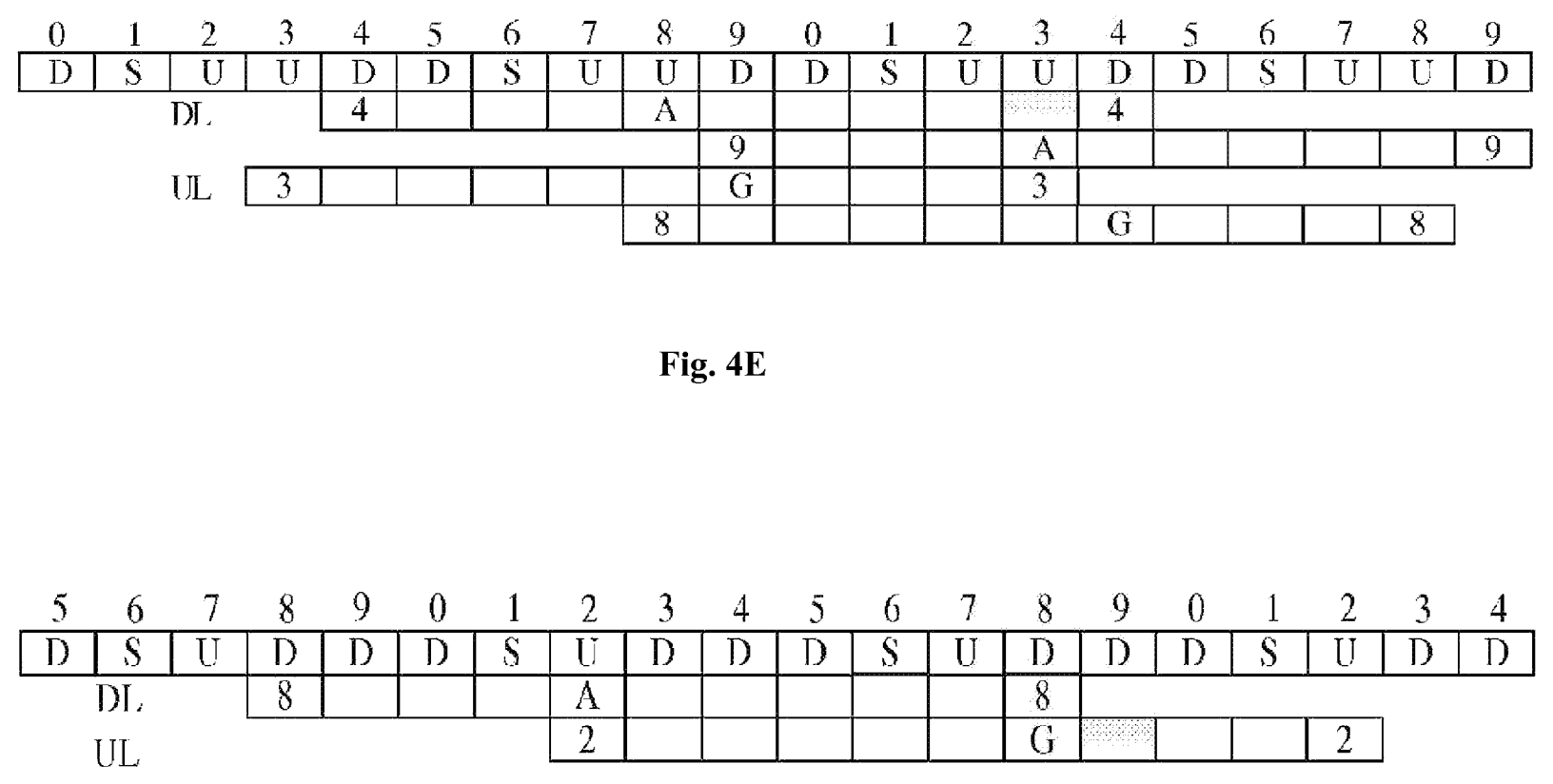

FIGS. 4A-4E are schematic views of backhaul link subframe allocation and HARQ operations under LTE TDD frame structure configuration 1;

FIGS. 5A-5F are schematic views of backhaul link subframe allocation and HARQ operations under LTE TDD frame structure configuration 2;

Figures 6B, 6C:
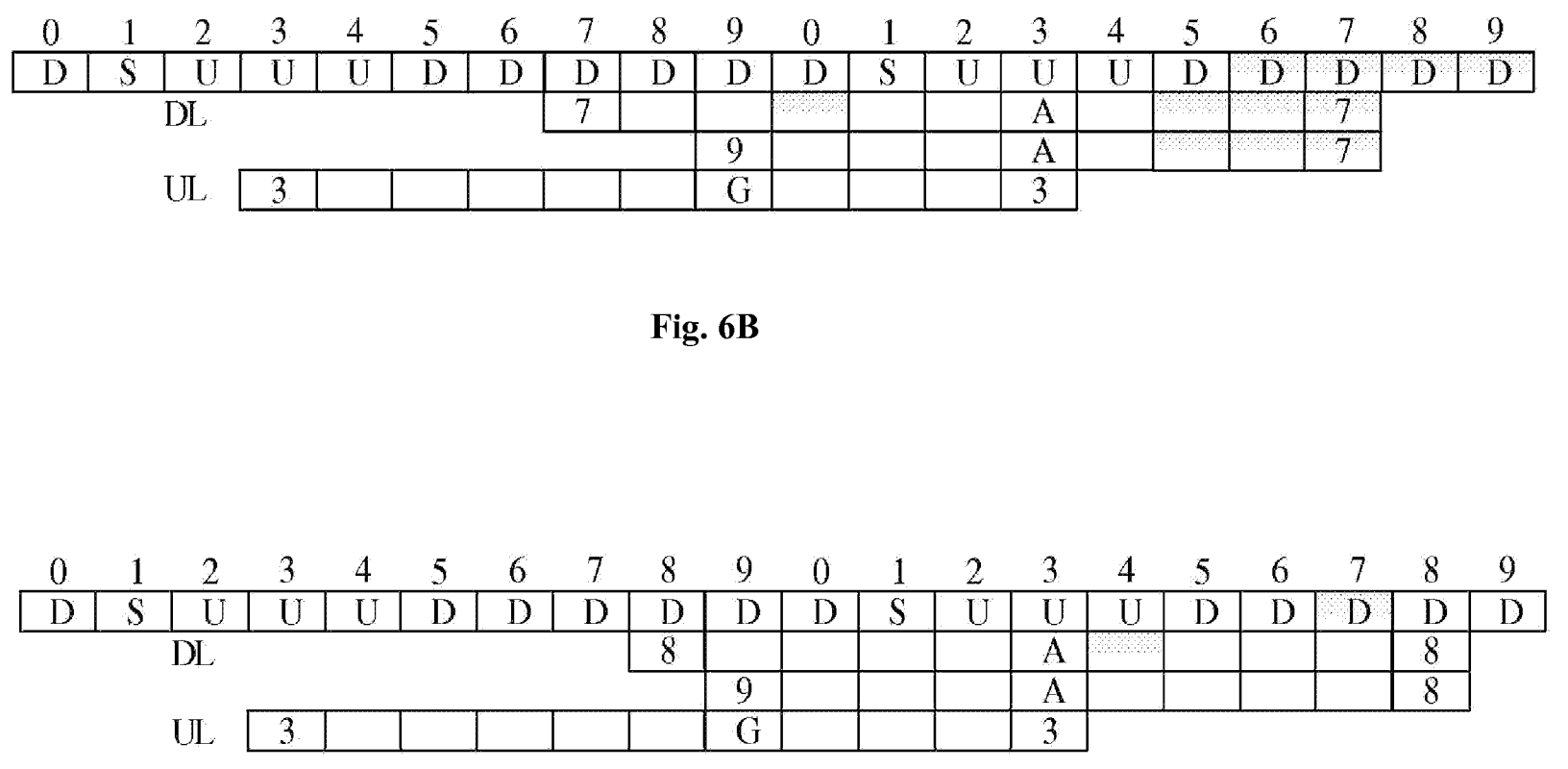
Figures 6D, 7A:
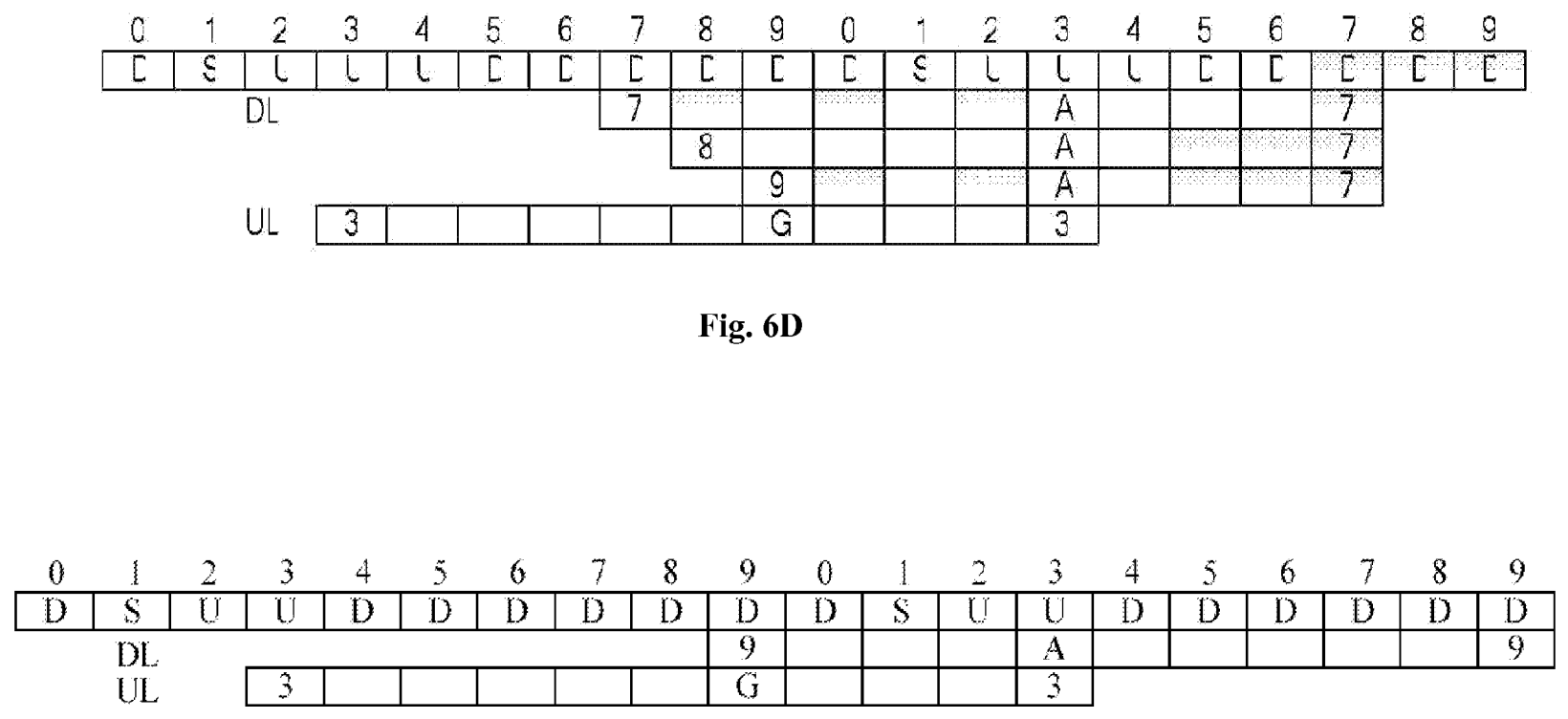

FIGS. 6A-6D are schematic views of backhaul link subframe allocation and HARQ operations under LTE TDD frame structure configuration 3;

Figures 7B, 7C:
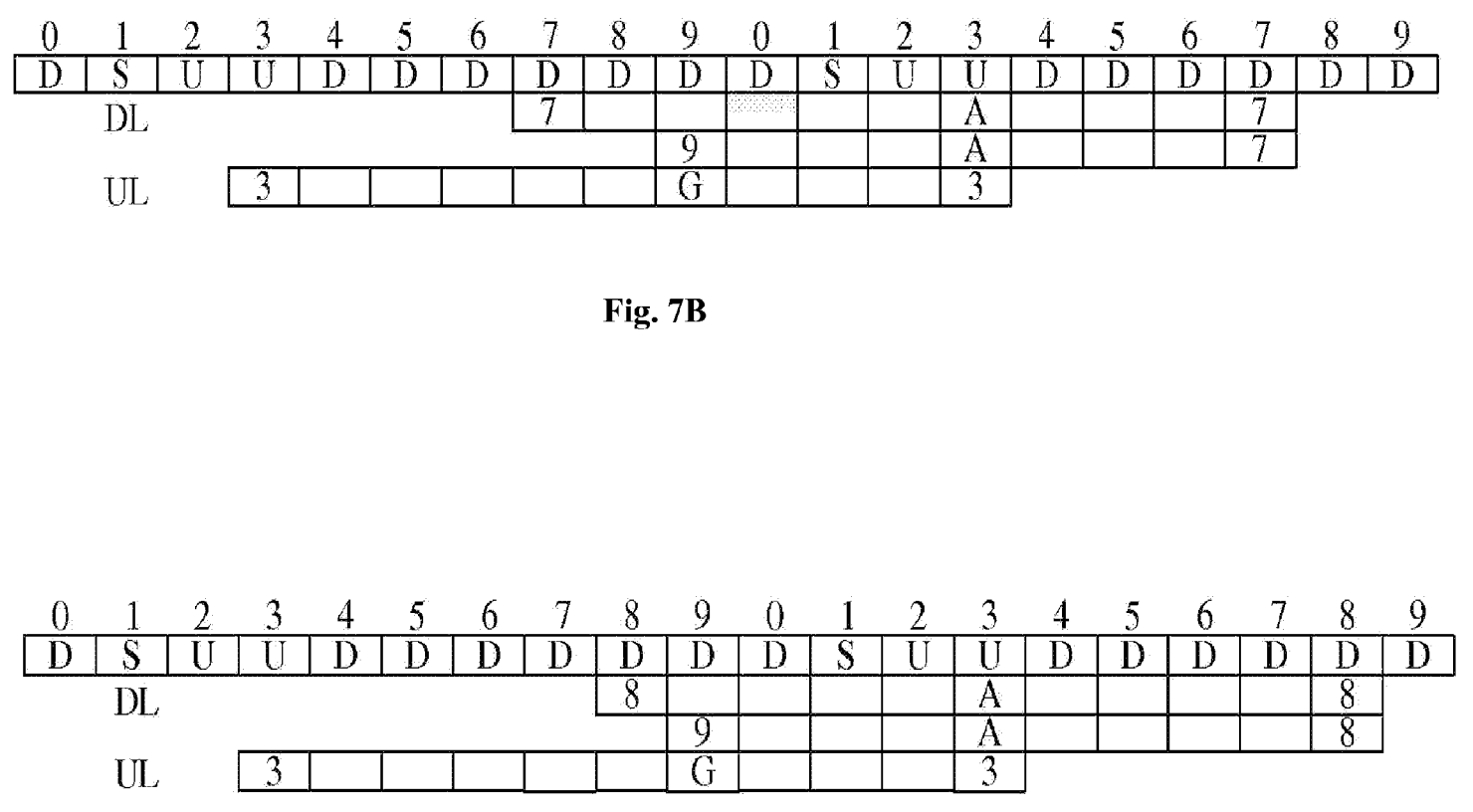
Figures 7D, 7E:
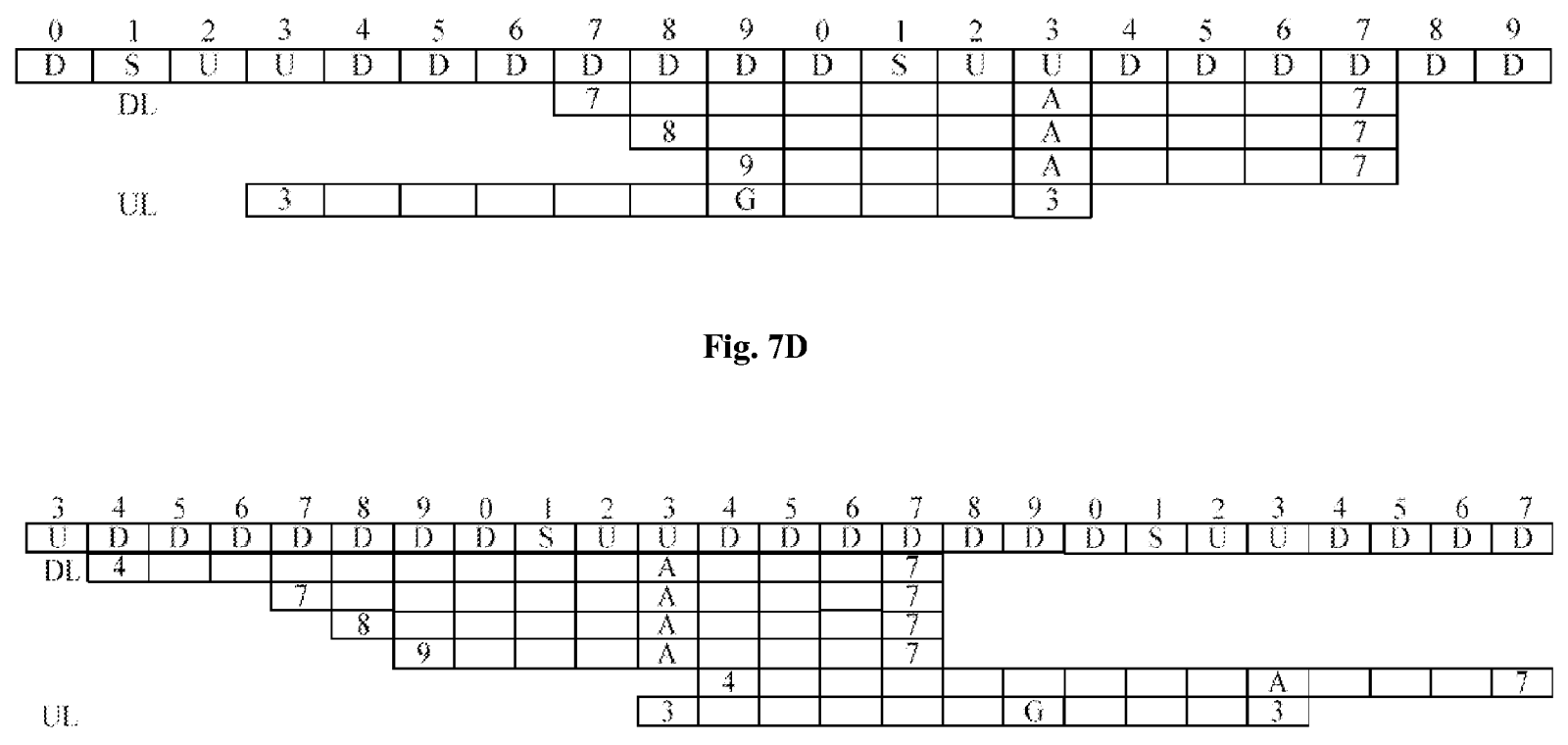

FIGS. 7A-7E are schematic views of backhaul link subframe allocation and HARQ operations under LTE TDD frame structure configuration 4;

FIG. 8 is a schematic view of backhaul link subframe allocation and HARQ operation under LTE TDD frame structure configuration 6;

DETAILED DESCRIPTION OF THE EMBODIMENTS

As shown in the Background Art, the prior art does not have properly designed backhaul link frame structure of the RN, and the embodiments of the present invention designs a proper backhaul link frame structure for the system by comprehensively considering the timing relationship of the HARQ in the system. The embodiments of the present invention are described taking an intra-band relay node (Type 1 relay) as an example.

Figure 1:
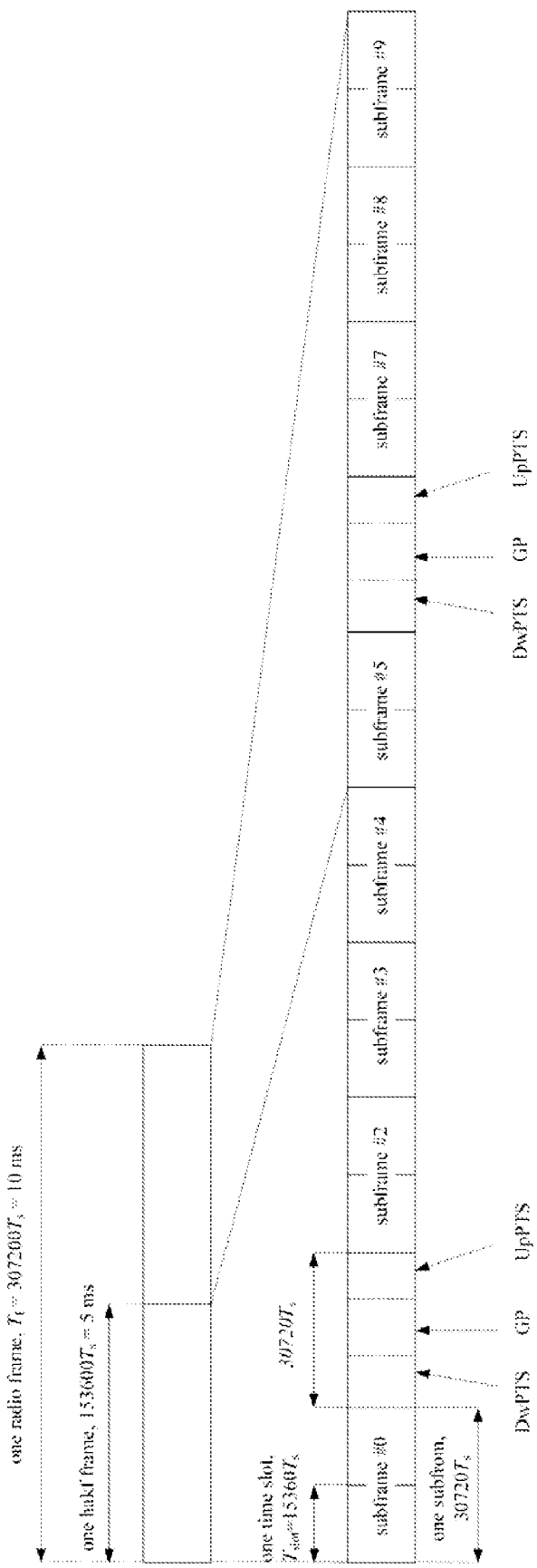
FIG. 1 is a schematic view of the frame structure in the TDD mode in the prior art.
Figure 2:
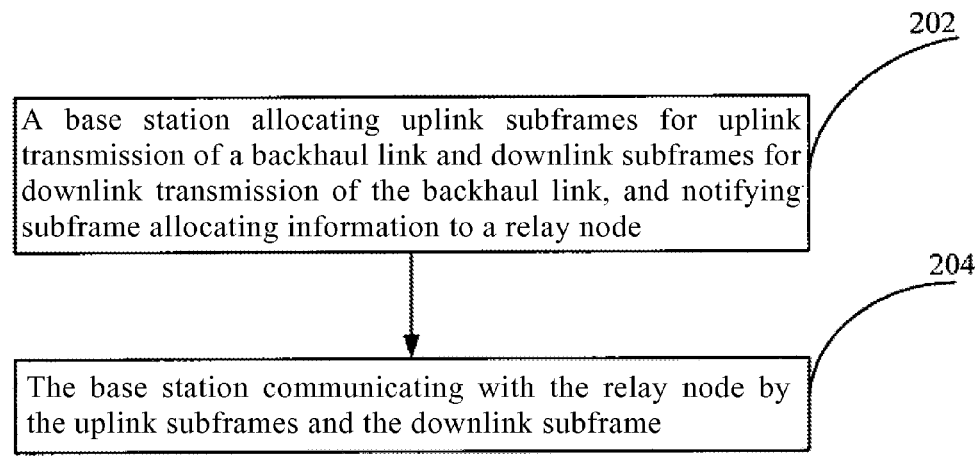
FIG. 2 is a schematic view of the flow of a configuring method of a backhaul link frame structure in a TDD system provided by the embodiment of the present invention.

FIG. 2 is a schematic view of the flow of a configuring method of a backhaul link frame structure provided by an embodiment of the present invention.

As shown in FIG. 2, the method comprises the following steps:

Step 202, a base station eNB allocates uplink subframes for backhaul link uplink transmitting and downlink subframes for backhaul link downlink transmitting, and notifies subframes allocating information to a relay node RN; and Step 204, the eNB communicates with the RN by the uplink subframes and the downlink subframes of a backhaul link.

Specifically, step S204 comprises: the eNB communicating with the RN by the uplink subframe and the downlink subframe of the backhaul link comprises: the eNB receiving the uplink data and/or uplink ACK/NACK feedback sent from the RN in the uplink subframe of the backhaul link; and the eNB sends downlink data and/or uplink scheduling information to the RN in the downlink subframe of the backhaul link.

Preferably, the eNB allocates the uplink subframes and downlink subframes of the backhaul link with a radio frame as a period; and Preferably, the number of the allocated downlink subframes of the backhaul link is equal to or larger than that of the allocated uplink subframes of the backhaul link.

Preferably, the eNB allocating the uplink subframes and downlink subframes of the backhaul link comprises: the eNB allocating uplink subframe n as the uplink subframe of the backhaul link; and the eNB allocating downlink subframe n−k1 as the downlink subframe of the backhaul link; wherein, k1 is the Hybrid Auto Repeat Request HARQ timing between the downlink subframe of the uplink scheduling information sent from the eNB and the uplink subframe of the corresponding uplink data sent from the RN.

Preferably, the eNB allocating uplink subframes and downlink subframes of the backhaul link comprises: the eNB allocating uplink subframe n as the uplink subframe of the backhaul link; and the eNB allocating downlink subframe n−k1 and downlink subframe set n−k2 as the downlink subframes of the backhaul link; wherein, k1 is the HARQ timing between the downlink subframe of the uplink scheduling information sent from the base station and the uplink subframe of the corresponding uplink data sent from the RN; k2 has many values, which could be the HARQ timing between the downlink subframe of the downlink data sent from the eNB and the uplink subframe of the corresponding uplink ACK/NACK sent from the RN.

Preferably, the eNB allocating uplink subframes and downlink subframes of the backhaul link comprises: the eNB allocating uplink subframe n as the uplink subframe of the backhaul link; and the eNB allocating downlink subframe n−k1, downlink subframe set n−k2 and downlink subframe set n−k3 as the downlink subframes of the backhaul link; wherein, k1 is the HARQ timing between the downlink subframe of the uplink scheduling information sent from the eNB and the uplink subframe of the corresponding uplink data sent from the RN; k2 has many values and is the HARQ timing between the downlink subframe of the downlink data sent from the eNB and the uplink subframe of the corresponding uplink ACK/NACK sent from the RN; and k3 has many values which are not equal to k1 or k2.

In addition, the eNB sends downlink data to the RN in downlink subframe m of the backhaul link; the eNB receives the ACK/NACK feedback sent from a corresponding RN in uplink subframe m+d1 of the backhaul link; the eNB retransmits downlink data or transmits new downlink data in downlink subframe m+d2 of the backhaul link; wherein, the uplink subframe m+d1 of the backhaul link is the first uplink subframe of the backhaul link 3 ms after the downlink subframe m of the backhaul link; and the downlink subframe m+d2 of the backhaul link is a random downlink subframe of the backhaul link 3 ms after the uplink subframe m+d1 of the backhaul link.

In addition, the eNB sends uplink scheduling information to the RN in downlink subframe m of the backhaul link; the eNB receives the uplink data sent from the RN in uplink subframe m+k1 of the backhaul link; the eNB sends uplink scheduling information to the RN in downlink subframe m+10 of the backhaul link, in order to schedule the RN to retransmit the uplink data or transmit new uplink data; wherein, k1 is the HARQ timing between the downlink subframe of the uplink scheduling information sent from the eNB and the uplink subframe of the corresponding uplink data sent from the RN.

Preferably, the allocated uplink subframes and downlink subframes of the backhaul link do not include subframes #0, or #1, or #5, or #6.

Figure 3:
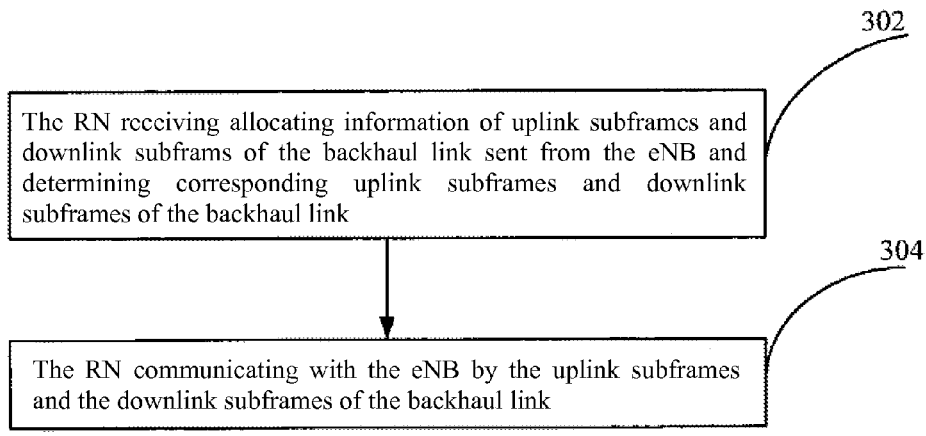
FIG. 3 is a schematic view of the flow of another configuring method of a backhaul link frame structure in a TDD system provided by the embodiment of the present invention.
Figure 5B:
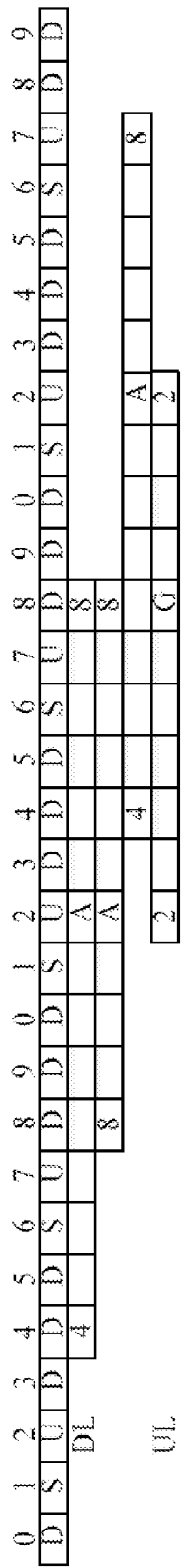
Figure 5C:
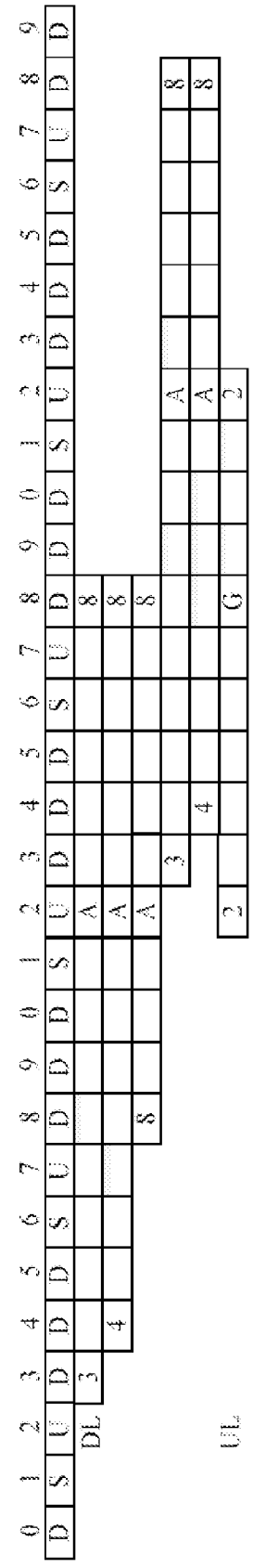
Figure 5F:
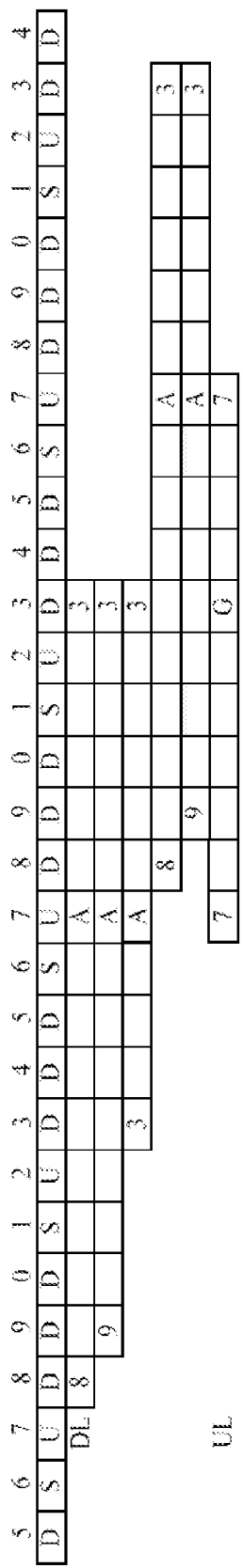
Figure 6A:
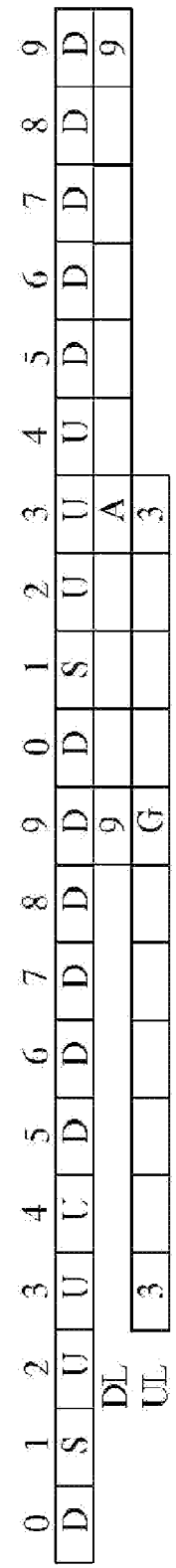

FIG. 3 is a schematic view of the flow of another configuring method of a backhaul link frame structure provided by the embodiment of the present invention.

As shown in FIG. 3, it comprises the following steps:

Step S302, the RN receives allocating information of uplink subframes and downlink subframs of the backhaul link sent from the eNB and determines corresponding uplink subframes and downlink subframes of the backhaul link; and Step S304, the RN communicates with the eNB by the uplink subframes and the downlink subframes of the backhaul link.

Specifically, step S304 comprises: the RN sends the uplink data and/or uplink ACK/NACK feedback to the eNB in the uplink subframes of the backhaul link; and the RN receives the downlink data and/or uplink scheduling information sent from the eNB in the downlink subframes of the backhaul link.

Preferably, the RN determines uplink subframe n as the uplink subframe of the backhaul link; and the RN determines downlink subframe n−k1 as the downlink subframe of the backhaul link; wherein, k1 is the Hybrid Auto Repeat Request HARQ timing between the downlink subframe of the uplink scheduling information sent from the eNB and the uplink subframe of the corresponding uplink data sent from the RN.

Preferably, the RN determines uplink subframe n as the uplink subframe of the backhaul link; and the RN determines downlink subframe n−k1 and downlink subframe set n−k2 as the downlink subframes of the backhaul link; wherein, k1 is the HARQ timing between the downlink subframe of the uplink scheduling information sent from the eNB and the uplink subframe of the corresponding uplink data sent from the RN; k2 has many values and is the HARQ timing between the downlink subframe of the downlink data sent from the eNB and the uplink subframe of the corresponding uplink ACK/NACK sent from the RN.

Preferably, the RN determines uplink subframe n as the uplink subframe of the backhaul link; and the RN determines downlink subframe n−k1, downlink subframe set n−k2 and downlink subframe set n−k3 as the downlink subframes of the backhaul link; wherein, k1 is the HARQ timing between the downlink subframe of the uplink scheduling information sent from the eNB and the uplink subframe of the corresponding uplink data sent from the RN; k2 has many values and is the HARQ timing between the downlink subframe of the downlink data sent from the eNB and the uplink subframe of the corresponding uplink ACK/NACK sent from the RN; and k3 has many values which are not equal to k1 or k2.

In addition, the RN receives the downlink data sent from the eNB in downlink subframe m of the backhaul link; the RN sends the ACK/NACK feedback to the eNB in uplink subframe m+d1 of the backhaul link; the RN receives the downlink data retransmitted by the eNB or new downlink data transmitted by the eNB in downlink subframe m+d2 of the backhaul link; wherein, the uplink subframe m+d1 of the backhaul link is the first uplink subframe of the backhaul link 3 ms after the downlink subframe m of the backhaul link; and the downlink subframe m+d2 of the backhaul link is a random downlink subframe of the backhaul link 3 ms after the uplink subframe m+d1 of the backhaul link.

In addition, the RN receives the uplink scheduling information sent from the eNB in downlink subframe m of the backhaul link; the RN sends the uplink data to the eNB in uplink subframe m+k1 of the backhaul link; the RN receives the uplink scheduling information sent from the eNB in downlink subframe m+10 of the backhaul link and retransmits the uplink data or transmits new uplink data to the eNB in uplink subframe m+10+k1 of the backhaul link according to the uplink scheduling information; wherein, k1 is the HARQ timing between the downlink subframe of the uplink scheduling information sent from the eNB and the uplink subframe of the corresponding uplink data sent from the RN.

Preferably, the uplink subframes and downlink subframes of the backhaul link determined by the RN do not include subframes #0, or #1, or #5, or #6.

As shown in table 1, for the TDD system, it has seven frame structure configurations in total. Wherein, configuration 0 does not have downlink subframes which can support the downlink transmission of the backhaul link. configuration 5 does not have uplink subframes which can support transmission of the backhaul link and the access link. Thus it is suggested that configuration 0 and configuration 5 should not support the deployment of the RN. In frame structures supporting the deployment of the RN, as the eNB and the RN need to send information such as broadcasting messages, synchronization signals and paging, etc. in subframes #0, or #1, or #5, or #6, they cannot be configured as MBSFN subframes, that is, they cannot be allocated as downlink subframes of the backhaul link.

For the TDD system, each frame structure configuration circulates with 10 ms as a period. Within each radio frame, the positions of the subframes are identical, thus it would be proper that using the period of 10 ms during allocating the uplink subframes and the downlink subframes of the backhaul link. In most of the frame structure configurations, as the number of the downlink subframes is larger than that of the uplink subframes, subframe allocation of the backhaul link supports both symmetric allocation and asymmetric allocation. The symmetric allocation refers to that the number of the downlink subframes of the backhaul link is equal to that of the uplink subframes of the backhaul link. And the asymmetric allocation refers to that the number of the downlink subframes of the backhaul link is larger than that of the uplink subframes of the backhaul link.

When the allocation supports symmetric allocation, if an uplink subframe n is allocated as the uplink subframe of the backhaul link, the downlink subframe n−k1 is allocated as the downlink subframe of the backhaul link, wherein, k1 is the HARQ timing between the uplink scheduling information and the corresponding transmission of uplink data specified in LTE specification (version 8), as shown in table 2. Such an allocation manner can ensure that the eNB can simultaneously schedules the RN and the macro UE to perform uplink data transmission in the same uplink subframe, which ensures a simple design of an eNB scheduler.

TABLE 2

| TDD uplink and downlink configurations | k1 value |||||||||||
|---|---|---|---|---|---|---|---|---|---|---|
| | Downlink subframe number m |||||||||||
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

For configurations 1, 2, 3, 4 and 6, if the eNB sends the uplink scheduling information in the downlink subframe m, the corresponding uplink data is sent in the uplink subframe n+k1, and the values of k1 are shown in table 2.

When the allocation supports asymmetric allocation, besides subframe pairs allocated symmetrically, it is also necessary to allocate additional downlink subframes of the backhaul link. To ensure minimum influence on the HARQ operation of the access link, the subframe set n−k2 is preferably allocated as the downlink subframes of the backhaul link (suppose the uplink subframe of the backhaul link is the subframe n), k2 can have many values, and is the HARQ timing between the downlink data transmission and the corresponding uplink ACK/NACK feedback specified in the LTE specification (version 8), as shown in table 3. If additional downlink subframes of the backhaul link need to be allocated, the subframe set n−k3 can be allocated as the downlink subframes of the backhaul link, and k3 can have many values which are not equal to the values of k1 or k2.

TABLE 3

| TDD uplink and downlink configurations | k2 value |||||||||||
|---|---|---|---|---|---|---|---|---|---|---|
| | Subframe number n |||||||||||
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 11, 6 | — | — | — | — | — | — | — |
| 6 | — | — | 7 | 7 | — | 5 | — | 7 | 7 | — |

As shown in table 3, k2 can have many values. When the eNB sends the downlink data in the subframes in the subframe set n−k2, the corresponding uplink ACK/NACK feedback is sent in the uplink subframe n.

Using the above subframe allocation manners can ensure minimum influence on the HARQ operation of the access link, but some subframe allocations will render a long HARQ RTT (Round-trip Time) of the backhaul link, for example, longer than 15 ms, which will affect the transmission of real-time services. To alleviate the influence, a threshold (for example, 15 ms) can be set for the HARQ RTT of the backhaul link, and those subframe allocations of the backhaul link which render the HARQ RTT longer than 15 ms can be deemed as improper allocation manners. According to the above rules, the best subframes of the backhaul links are allocated for each configuration of the TDD.

Based on the allocated uplink subframes and downlink subframes of the backhaul link, the HARQ operation of the backhaul link may be performed. The downlink HARQ is the same as that in the LTE specification (version 8), using an asynchronous adaptive HARQ, that is, the timing between the preliminary transmission of the downlink data and the corresponding uplink ACK/NACK feedback is fixed, while retransmission or a new preliminary transmission depends on the scheduling of the eNB, that is, the timing between the uplink ACK/NACK and the retransmission or new preliminary transmission is not fixed, which need not be specified by standards. For the uplink HARQ, operations different from the LTE specification (version 8) is adopted. In the LTE specification, the uplink HARQ uses a synchronous non-adaptive HARQ, and the timing between the preliminary transmission of the uplink data and the downlink ACK/NACK (PHICH, a channel for transmitting downlink ACK/NACK) and the timing between the PHICH/uplink scheduling information (the PHICH and the uplink scheduling information are in the same subframe) and the uplink retransmission or the new preliminary transmission are both fixed, and should be specified by standards. When the transmission of the uplink data is wrong, the eNB sends the NACK via the PHICH channel (Physical HARQ Indication Channel), and when the indicator bit of the new data in the uplink scheduling information is 0, the uplink data is retransmitted in the same resource; if the data transmission is correct, the eNB sends the ACK via the PHICH and sends new uplink scheduling information via a control channel. When the indicator bit of the new data in the uplink scheduling information is 1, the new uplink data is transmitted in the resource specified in the uplink scheduling information, such a design can save signaling overhead. In the backhaul link, as the quality of the link is better than that of a direct link, the uplink HARQ uses synchronous adaptive HARQ, and no R-PHICH is designed, the uplink scheduling information transmitted via an R-PDCCH channel is used to schedule the retransmission or new preliminary transmission, and the retransmission or the preliminary transmission is differentiated through the indicator bit of the new data in the uplink scheduling information. The timing between the uplink scheduling information and the corresponding uplink transmission and the timing between uplink transmission and the next uplink scheduling information are both fixed and should be specified by standards.

Due to the processing speeds of hardware, the standards define that the decoding time delay of data or feedback should not be less than 3 ms, thus, during the HARQ operation, it needs to ensure the time delay from the data to the feedback should not be less than 3 ms, and the time delay from scheduling to data transmission should not be less than 3 ms, either.

Based on the allocated subframes of the backhaul link and the new HARQ operation, a new HARQ operation is designed for the subframe allocation of the backhaul link of each TDD configuration.

The subframe allocation and HARQ operation of the backhaul link of each TDD frame structure will be described hereinafter in details in conjunction with FIGS. 4A-8.

TDD Configuration 1:

As shown in table 2, according to the rules in the LTE specification (version 8), the uplink scheduling information of the downlink subframe 4 schedules the uplink data of the uplink subframe 8, the uplink scheduling information of the downlink subframe 9 schedules the uplink data of the uplink subframe 3, meanwhile, according to table 2, the uplink ACK/NACK feedback corresponding to the downlink data of the downlink subframe 4 is in the uplink subframe 8, and the uplink ACK/NACK feedback corresponding to the downlink data of the downlink subframe 9 is in the uplink subframe 3.

When symmetric allocation is supported, the downlink subframe 4 and the uplink subframe 8 can be respectively allocated as the downlink subframe and the uplink subframe of the backhaul link, or the downlink subframe 9 and the uplink subframe 3 can be respectively allocated as the downlink subframe and the uplink subframe of the backhaul link, or the downlink subframes (4, 9) and the uplink subframes (3, 8) can all be allocated as the downlink subframe and the uplink subframe of the backhaul link.

When asymmetric allocation is supported, the downlink subframes (4, 9) can both be allocated as the downlink subframes of the backhaul link, and the uplink subframe 3 or 8 can be allocated as the uplink subframe of the backhaul link. According to the above rules, five subframe allocations of the backhaul link are formed, as shown in FIGS. 4A-4E. Such subframe allocations have no influence on the HARQ operation of the access link, and the HARQ RTT of the backhaul link will not exceed 15 ms.

Based on the allocated subframes of the backhaul link, the HARQ operation may be designed. Taking FIG. 4A as an example, the eNB sends the downlink data in the downlink subframe 4 of the backhaul link, the RN sends the uplink ACK/NACK feedback in the uplink subframe 8 of the backhaul link, the retransmission or new preliminary transmission may be conducted in the downlink subframe 4 of the next backhaul link as early as possible, and the minimum downlink HARQ RTT is 10 ms. The RN sends the uplink data in the uplink subframe 8, the eNB sends the uplink scheduling information in the downlink subframe 4, the RN conducts retransmission of uplink data or preliminary transmission of new uplink data in the uplink subframe 8 of the next backhaul link, and the HARQ RTT is 10 ms. There is one downlink HARQ progress and one uplink HARQ progress.

The above timing relationship is the same with the rule in the LTE specification (version 8), no new design is needed, and enough decoding time delay is ensured.

TDD Configuration 2:

The TDD configuration 2 has totally two uplink subframes in each radio frame. According to table 3, the uplink ACK/NACK corresponding to the downlink data of the downlink subframes 5 and 6 needs to be sent in the uplink subframe 2, the uplink ACK/NACK corresponding to the downlink data of the downlink subframes 0 and 1 needs to be sent in the uplink subframe 7, no matter which uplink subframe is configured as the uplink subframe of the backhaul link, the influences on the HARQ operation of the access link are identical, i.e., part of the downlink data of the access link does not have corresponding uplink ACK/NACK feedback.

When the subframe 2 is configured as the uplink subframe of the backhaul link, according to table 2, the uplink scheduling information of the downlink subframe 8 schedules the uplink transmission data of the uplink subframe 2, when symmetric allocation is supported, the subframe 2 and the subframe 8 are respectively allocated as the uplink subframe and the downlink subframe of the backhaul link; when asymmetric allocation is supported, according to table 3, the uplink ACK/NACK corresponding to the downlink data of the downlink subframes 4 and 8 is in the uplink subframe 2, besides the subframe 8, the downlink subframe 4 may be preferably allocated as the downlink subframe of the backhaul link. If more downlink subframes of the backhaul link are needed, the downlink subframe 3 and/or 9 may be further allocated as the downlink subframes of the backhaul link. But allocating the subframe 9 as the downlink subframe of the backhaul link will render that the minimum RTT of some progress of the downlink HARQ of the backhaul link is 19 ms, which will affect real-time services, and then such an allocation is deemed improper.

When the subframe 7 is configured as the uplink subframe of the backhaul link, according to table 2, the uplink scheduling information of the downlink subframe 3 schedules the uplink data transmission of the uplink subframe 2, when symmetric allocation is supported, the subframe 3 and the subframe 7 are respectively allocated as the downlink subframe and the uplink subframe of the backhaul link; when asymmetric allocation is supported, according to table 3, the uplink ACK/NACK corresponding to the downlink data of the downlink subframes 3 and 9 is in the uplink subframe 7, besides the subframe 3, the downlink subframe 9 may be preferably allocated as the downlink subframe of the backhaul link. If more downlink subframes of the backhaul link are needed, the downlink subframe 4 and/or 8 may be further allocated as the downlink subframes of the backhaul link. But allocating the subframe 4 as the downlink subframe of the backhaul link will render that the minimum RTT of some progress of the downlink HARQ of the backhaul link is 19 ms, which will affect real-time services, and then such an allocation is deemed improper.

In view of the above description, six proper subframe allocations of the backhaul link are totally designed, as shown in FIGS. 5A-5F.

Based on the allocated subframes of the backhaul link, designs of the HARQ operation are rendered. Taking FIG. 5C as an example, the eNB sends downlink data packets in downlink subframes (3, 4 and 8), the corresponding uplink ACK/NACK feedback is in the uplink subframe 2, the earliest retransmission or new preliminary transmission is in the next downlink subframe 8, the minimum RTT of the HARQ progress formed by the downlink data transmission of the downlink subframe 3, and there are five downlink progresses. It needs to be explained that the transmission of multiple ACK/NACK feedbacks corresponding to multiple downlink data packets may be conducted with the ACK/NACK bundling or ACK/NACK multiplexing specified in the LTE specification (version 8). According to the LTE specification (version 8), the uplink ACK/NACK feedback corresponding to the downlink data of the downlink subframe 3 is in the uplink subframe 7, thus the timing between the downlink subframe 3 and the uplink subframe 2 needs to be redesigned.

The RN sends the uplink data in the uplink subframe 2, the eNB sends the uplink scheduling information in the downlink subframe 8, the RN conducts retransmission of uplink data or preliminary transmission of new uplink data in the next uplink subframe 2, and the HARQ RTT is 10 ms. There is one uplink progress.

TDD Configuration 3:

According to table 3, the uplink subframe 2 and the uplink subframe 4 need to send the uplink ACK/NACK feedback corresponding to the downlink data of the subframes (0, 1, 5 and 6), which will affect the HARQ operation of the access link and render that some downlink transmission does not have corresponding ACK/NACK feedback. To minimize the influence on the HARQ operation of the access link, the uplink subframe 3 is allocated as the uplink subframe of the backhaul link; according to table 2, the uplink scheduling information of the downlink subframe 9 schedules the uplink data transmission of the uplink subframe 3, when symmetric allocation is supported, the eNB respectively allocates the uplink subframe 3 and the downlink subframe 9 as the uplink subframe and the downlink subframe of the backhaul link. According to table 3, the uplink ACK/NACK corresponding to the downlink data of the downlink subframes 7 and 8 is in the uplink subframe 3, if asymmetric allocation is supported, the downlink subframe 7 and/or 8 are preferably allocated as the downlink subframes of the backhaul link, which can minimize the influence on the HARQ operation of the access link. According to the above allocation manner, four subframe allocations of the backhaul link are totally formed, as shown in FIGS. 6A-6D.

Based on the allocated subframes of the backhaul link, designs of the HARQ operation are rendered. Taking FIG. 6D as an example, the eNB sends downlink data in downlink subframes (7, 8 and 9), the corresponding uplink ACK/NACK is sent in the uplink subframe 3, the earliest retransmission or new preliminary transmission of new data is in the next downlink subframe 7, the minimum RTT of neither of the progresses is larger than 10 ms, and there are three progresses. As the uplink ACK/NACK feedback corresponding to the downlink data of the downlink subframe 9 is in the uplink subframe 4, the timing between the downlink subframe 9 and the uplink subframe 3 needs to be redefined.

The RN sends the uplink data in the uplink subframe 3, the eNB sends the uplink scheduling information in the downlink subframe 9, the RN conducts retransmission of uplink data or preliminary transmission of new uplink data in the next uplink subframe 3, and the HARQ RTT is 10 ms. There is one progress.

TDD Configuration 4:

According to table 3, the uplink subframe 2 transmits the uplink ACK/NACK corresponding to the downlink data of the subframes (0, 1, 5), and the uplink subframe 3 transmits the uplink ACK/NACK corresponding to the downlink data of the subframe 6. To minimize the influence on the HARQ operation of the access link, the uplink subframe 3 is allocated as the uplink subframe of the backhaul link; according to table 2, the uplink scheduling information of the downlink subframe 9 schedules the uplink data of the uplink sub frame 3, when symmetric allocation is supported, the eNB respectively allocates the uplink subframe 3 and the downlink subframe 9 as the uplink subframe and the downlink subframe of the backhaul link. According to table 3, the uplink ACK/NACK corresponding to the downlink data of the downlink subframes 7 and 8 is in the uplink subframe 3, if asymmetric allocation is supported, the downlink subframe 7 and/or 8 are preferably allocated as the downlink subframes of the backhaul link, which can minimize the influence on the HARQ operation of the access link. If more downlink subframes are needed, the downlink subframe 4 may be allocated as the downlink subframe of the backhaul link, which has no influence on the HARQ operation of the access link. According to the above allocation manner, five subframe allocations of the backhaul link are totally formed, as shown in FIGS. 7A-7E.

Based on the allocated subframes of the backhaul link, designs of the HARQ operation are rendered. Taking FIG. 7E as an example, the eNB sends downlink data in downlink subframes (4, 7, 8 and 9), the corresponding uplink ACK/NACK is sent in the uplink subframe 3, the earliest retransmission or new preliminary transmission of new data is in the next downlink subframe 7, the minimum RTT of the HARQ progress formed by the transmission of the downlink data of the downlink subframe 4 is 13 ms, and there are totally five progresses. As the uplink ACK/NACK feedbacks corresponding to the downlink data of the downlink subframe 4 are respectively in the uplink subframe 2, the timing between the downlink subframe 4 and the uplink subframe 2 needs to be redefined.

The RN sends the uplink data in the uplink subframe 3, the eNB sends the uplink scheduling information in the downlink subframe 9, the RN conducts retransmission of uplink data or preliminary transmission of new uplink data in the next uplink subframe 3, and the HARQ RTT is 10 ms. There is one progress.

TDD Configuration 6:

For the TDD configuration 6, only the downlink subframe 9 can be configured as an MBSFN subframe serving as the downlink subframe of the backhaul link; according to tables 2 and 3, the uplink scheduling information of the downlink subframe 9 schedules the uplink data of the uplink subframe 4, and the uplink ACK/NACK corresponding to the downlink data of the downlink subframes 9 is in the uplink subframe 4, thus the eNB respectively allocates the uplink subframe 4 and the downlink subframe 9 as the uplink subframe and the downlink subframe of the backhaul link, as shown in FIG. 8.

As the uplink HARQ progress of the access link is circulating, allocating any uplink subframe as the uplink subframe of the backhaul link will affect the uplink HARQ operation of the access link, but the RN can send the ACK ahead of time to suspend the uplink progress so as to solve the above problem.

Based on the allocated subframes, designs of the HARQ are rendered. The eNB sends downlink data in the downlink subframe 9, the RN sends the uplink ACK/NACK in the uplink subframe 4, the eNB can conduct retransmission of data or preliminary transmission of new data in the next downlink subframe 9 as early as possible, the minimum RTT is 10 ms, and there is one progress.

The RN sends the uplink data in the uplink subframe 4, the eNB sends the uplink scheduling information in the downlink subframe 9, the RN conducts retransmission of data or preliminary transmission of new data in the next uplink subframe 4, and the HARQ RTT is 10 ms. There is one progress. The timing between the uplink data and the uplink scheduling is different from the rule of the LTE specification (version 8) and then should be redefined.

Thus, with the method provided by the embodiment of the present invention, the uplink subframes and downlink subframes of the backhaul link are allocated according to certain rules, effective communication between the eNB and the RN at the backhaul link is ensured, the transmission performance of the access link will not be affected; conducting related HARQ operation based on the allocated subframes of the backhaul link would enable retransmission of incorrectly transmitted downlink data and downlink data, which ensures the reliability of backhaul link communication.

Figure 9:
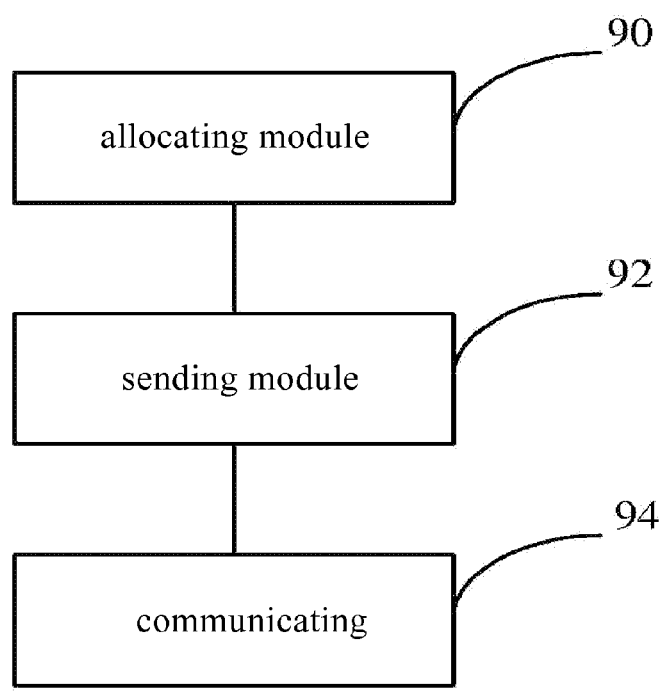
FIG. 9 is a schematic view of the structure of a base station eNB provided by the embodiment of the present invention.

FIG. 9 is a schematic view of the structure of a base station provided by the embodiment of the present invention.

Referring to FIG. 9, the base station comprises: an allocating module 90 configured to allocate uplink subframes for uplink transmission of a backhaul link and downlink subframes for downlink transmission of the backhaul link; a sending module 92 configured to notify sub frame allocating information to a relay node; and a communicating module 94 configured to communicate with the relay node by the uplink subframes and the downlink subframes of the backhaul link.

Specifically, the communicating module 94 also comprises: a receiving device configured to receive the uplink data and/or uplink ACKnowledge Character/Negative ACKnowledgement feedback sent from the relay node in the uplink subframes of the backhaul link; and a sending device configured to send downlink data and/or uplink scheduling information to the relay node in the downlink subframes of the backhaul link.

Preferably, the allocating module 90 allocates uplink subframe n as the uplink subframe of the backhaul link, and allocates downlink subframe n−k1 as the downlink subframe of the backhaul link, wherein, k1 is the Hybrid Auto Repeat Request HARQ timing between the downlink subframe of the uplink scheduling information sent from the base station and the uplink subframe of the corresponding uplink data sent from the relay node.

Preferably, the allocating module 90 allocates uplink subframe n as the uplink subframe of the backhaul link and allocates downlink subframe n−k1 and downlink subframe set n−k2 as the downlink subframes of the backhaul link; wherein, k1 is the HARQ timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACK/NACK sent from the relay node.

Preferably, the allocating module 90 allocates uplink subframe n as the uplink subframe of the backhaul link and allocates downlink subframe n−k1, downlink subframe set n−k2 and downlink subframe set n−k3 as the downlink subframes of the backhaul link; wherein, k1 is the HARQ timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACK/NACK sent from the relay node; and k3 has many values which are not equal to k1 or k2.

Figure 10:
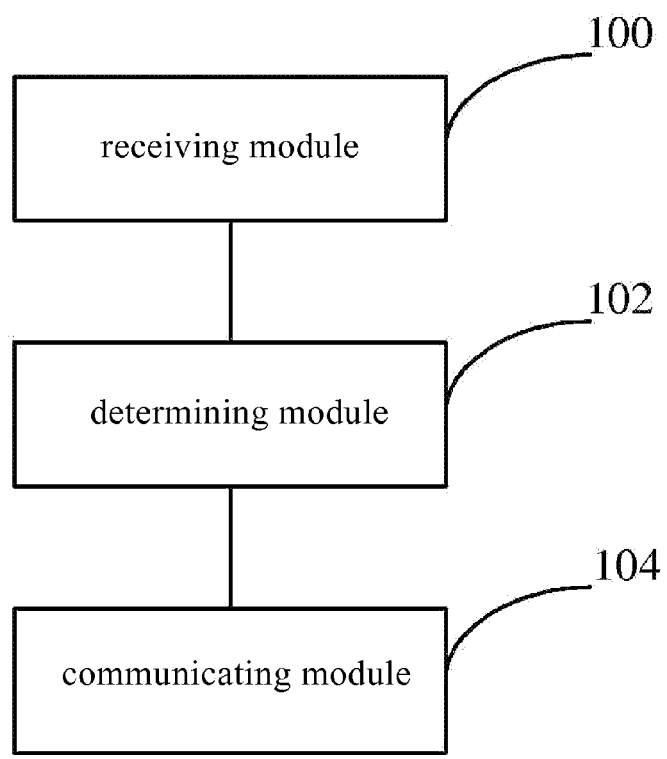
FIG. 10 is a schematic view of the structure of a relay device RN provided by the embodiment of the present invention.

FIG. 10 is a schematic view of the structure of a relay device provided by the embodiment of the present invention.

Referring to FIG. 10, the relay device comprises: a receiving module 100 configured to receive subframe allocating information of uplink subframes for uplink transmission of a backhaul link and downlink subframes for downlink transmission of the backhaul link from a base station; a determining module 104 configured to determine the uplink subframes and the downlink subframes of the backhaul link according to the subframe allocating information; and a communicating module 106 configured to communicate with the base station by the uplink subframes and downlink subframes of the backhaul link.

In addition, the communicating module 106 also comprises: a sending device configured to send the uplink data and/or uplink ACKnowledge Character/Negative ACKnowledgement feedback to the base station in the uplink subframes of the backhaul link; and a receiving device configured to receive downlink data and/or uplink scheduling information sent from the base station in the downlink subframes of the backhaul link.

Preferably, the determining module 104 determines uplink subframe n as the uplink subframe of the backhaul link, and determines downlink subframe n−k1 as the downlink subframe of the backhaul link, wherein, k1 is the Hybrid Auto Repeat Request HARQ timing between the downlink subframe of the uplink scheduling information sent from the base station and the uplink subframe of the corresponding uplink data sent from the relay node.

Preferably, the determining module 104 determines uplink subframe n as the uplink subframe of the backhaul link and determines downlink subframe n−k1 and downlink subframe set n−k2 as the downlink subframes of the backhaul link; wherein, k1 is the HARQ timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACK/NACK sent from the relay node.

Preferably, the determining module 104 determines uplink subframe n as the uplink subframe of the backhaul link and determines downlink subframe n−k1, downlink subframe set n−k2 and downlink subframe set n−k3 as the downlink subframes of the backhaul link; wherein, k1 is the HARQ timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACK/NACK sent from the relay node; and k3 has many values which are not equal to k1 or k2.

In addition, the present invention further provides a system for backhaul link communication in a TDD (Time Division Duplexing) system, comprising a base station and a relay node, wherein, the base station allocates uplink subframes for uplink transmission of a backhaul link and downlink subframes for downlink transmission of the backhaul link and notifies the relay node of subframe allocating information; the relay node receives the subframe allocating information and determines corresponding uplink subframes and downlink subframes of the backhaul link, and communicates with the base station by the uplink subframes and downlink subframes of the backhaul link.

Preferably, the relay node determines uplink subframe n as the uplink subframe of the backhaul link; the relay node determines downlink subframe n−k1 as the downlink subframe of the backhaul link, wherein, k1 is the Hybrid Auto Repeat Request HARQ timing between the downlink subframe of the uplink scheduling information sent from the base station and the uplink subframe of the corresponding uplink data sent from the relay node.

Preferably, the relay node determines uplink subframe n as the uplink subframe of the backhaul link; the relay node determines downlink subframe n−k1 and downlink subframe set n−k2 as the downlink subframes of the backhaul link; wherein, k1 is the HARQ timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACK/NACK sent from the relay node.

Preferably, the relay node determines uplink subframe n as the uplink subframe of the backhaul link; the relay node determines downlink subframe n−k1, downlink subframe set n−k2 and downlink subframe set n−k3 as the downlink subframes of the backhaul link; wherein, k1 is the HARQ timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACK/NACK sent from the relay node; and k3 has many values which are not equal to k1 or k2.

From the above description, in the embodiments of the present invention, the uplink subframes and downlink subframes of the backhaul link are allocated according to certain rules, effective communication between the eNB and the RN at the backhaul link is ensured, the transmission performance of the access link will not be affected; conducting related HARQ operation based on the allocated subframes of the backhaul link would enable retransmission of incorrectly transmitted downlink data and downlink data, which ensures the reliability of backhaul link communication.

Although the embodiments of the present invention have been illustrated and described, one skilled in the art can make changes, modifications, substitutions and variations to such embodiments without departing from the principles and spirit of the present invention. The scope of the present invention is defined by the appended claims and the equivalents thereof.

The invention claimed is:

1. A method for backhaul link communication in a Time Division Duplexing system, wherein, the method includes:
   allocating, by means of a base station, uplink subframes for uplink transmitting of the backhaul link and downlink subframes for downlink transmitting of the backhaul link, and notifying the allocating information of the subframes to a relay node; and
   communicating, by means of the base station, with the relay node by the uplink subframes and the downlink subframes of the backhaul link;
   wherein, the allocating, by means of the base station, the uplink subframes and the downlink subframes of the backhaul link comprises:
   the base station allocates the uplink subframe n as the uplink subframe of the backhaul link; and
   the base station allocates the downlink subframe n−k1 and the downlink subframe set n−k2 as the downlink subframes of the backhaul link;
   wherein, k1 is a HARQ (Hybrid Auto Repeat Request) timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACKnowledge Character/Negative ACKnowledgement sent from the relay node.

2. The method according to claim 1, wherein, the communicating, by means of the base station, with the relay node by the uplink subframes and the downlink subframes of the backhaul link comprises:
   the base station receives uplink data and/or uplink ACKnowledge Character/Negative ACKnowledgement feedback sent from the relay node in the uplink subframes of the backhaul link; and
   the base station sends downlink data, uplink scheduling information, or both downlink data and uplink scheduling information to the relay node in the downlink subframes of the backhaul link.

3. The method according to claim 1, wherein, the base station allocates the uplink subframes and the downlink subframes of the backhaul link with a radio frame as a period.

4. The method according to claim 1, wherein, the number of the allocated downlink subframes of the backhaul link is equal to or larger than that of the allocated uplink subframes of the backhaul link.

5. The method according to claim 1, wherein, the allocating, by means of the base station, the uplink subframes and the downlink subframes of the backhaul link comprises:
   the base station allocates the uplink subframe n as the uplink subframe of the backhaul link; and
   the base station allocates the downlink subframe n−k1 as the downlink subframe of the backhaul link.

6. The method according to claim 1, wherein, the allocating, by means of the base station, the uplink subframes and the downlink subframes of the backhaul link comprises:
the base station allocates the uplink subframe n as the uplink subframe of the backhaul link;
the base station allocates the downlink subframe n−k1, the downlink subframe set n−k2 and the downlink subframe set n−k3 as the downlink subframes of the backhaul link; and
k3 has many values which are not equal to k1 or k2.

7. The method according to claim 1, wherein,
the base station sends downlink data to the relay node in the downlink subframe m of the backhaul link;
the base station receives the ACKnowledge Character/Negative ACKnowledgement feedback sent from the corresponding relay node in the uplink subframe m+d1 of the backhaul link;
the base station retransmits the downlink data or transmits new downlink data to the relay node in the downlink subframe m+d2 of the backhaul link;
wherein, the uplink subframe m+d1 of the backhaul link is the first uplink subframe of the backhaul link 3 ms after the downlink subframe m of the backhaul link; and the downlink subframe m+d2 of the backhaul link is a random downlink subframe of the backhaul link 3 ms after the uplink subframe m+d1 of the backhaul link.

8. The method according to claim 1, wherein,
the base station sends the uplink scheduling information to the relay node in the downlink subframe m of the backhaul link;
the base station receives the uplink data sent from the relay node in the uplink subframe m+k1 of the backhaul link;
the base station sends the uplink scheduling information to the relay node in the downlink subframe m+10 of the backhaul link, in order to schedule the relay node to retransmit the uplink data or transmit new uplink data;
wherein, k1 is the HARQ timing between the downlink subframe of the uplink scheduling information sent from the base station and the uplink subframe of the corresponding uplink data sent from the relay node.

9. The method according to claim 1, wherein,
the allocated uplink subframes and downlink subframes of the backhaul link do not include subframes #0, or #1, or #5, or #6.

10. A method for backhaul link communication in a Time Division Duplexing system, wherein, the method includes:
receiving, by means of a relay node, allocating information of uplink subframes and downlink subframes of the backhaul link sent from a base station, and determining corresponding uplink subframes and downlink subframes of the backhaul link; and
communicating, by means of the relay node, with the base station by the uplink subframes and the downlink subframes of the backhaul link;
wherein, the relay node determines the uplink subframe n as the uplink subframe of the backhaul link; and
the relay node determines the downlink subframe n−k1 and the downlink subframe set n−k2 as the downlink subframes of the backhaul link;
wherein, k1 is a HARQ (Hybrid Auto Repeat Request) timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACKnowledge Character/Negative ACKnowledgement sent from the relay node.

11. The method according to claim 10, wherein, the communicating, by means of the relay node, with the base station by the uplink subframes and the downlink subframes of the backhaul link comprises:
the relay node sends uplink data, ACKnowledge character/negative ACKnowledgement feedback, or both uplink data and uplink ACKnowledge character/negative ACKnowledgement feedback to the base station in the uplink subframes of the backhaul link; and
the relay node receives downlink data and/or uplink scheduling information sent from the base station in the downlink subframe of the backhaul link.

12. The method according to claim 10, wherein,
the relay node determines the uplink subframe n as the uplink subframe of the backhaul link; and
the relay node determines the downlink subframe n−k1 as the downlink subframe of the backhaul link.

13. The method according to claim 10, wherein,
the relay node determines the uplink subframe n as the uplink subframe of the backhaul link; and
the relay node determines the downlink subframe n−k1, the downlink subframe set n−k2 and the downlink subframe set n−k3 as the downlink subframes of the backhaul link; and
k3 has many values which are not equal to k1 or k2.

14. The method according to claim 10, wherein,
the relay node receives the downlink data sent from the base station in the downlink subframe m of the backhaul link;
the relay node sends the ACKnowledge Character/Negative ACKnowledgement feedback to the base station in the uplink subframe m+d1 of the backhaul link;
the relay node receives the downlink data retransmitted by the base station or new downlink data transmitted by the base station in the downlink subframe m+d2 of the backhaul link;
wherein, the uplink subframe m+d1 of the backhaul link is the first uplink subframe of the backhaul link 3 ms after the downlink subframe m of the backhaul link; and the downlink subframe m+d2 of the backhaul link is a random downlink subframe of the backhaul link 3 ms after the uplink subframe m+d1 of the backhaul link.

15. The method according to claim 10, wherein,
the relay node receives the uplink scheduling information sent from the base station in the downlink subframe m of the backhaul link;
the relay node sends the uplink data to the base station in the uplink subframe m+k1 of the backhaul link;
the relay node receives the uplink scheduling information sent from the base station in the downlink subframe m+10 of the backhaul link and retransmits the uplink data or transmits new uplink data to the base station according to the uplink scheduling information.

16. A system for backhaul link communication in a Time Division Duplexing system, wherein, the system comprises a base station and a relay node, wherein,
the base station allocates uplink subframes for uplink transmission of the backhaul link and downlink subframes for downlink transmission of the backhaul link and notifies the relay node of subframe allocating information,
the relay node receives the subframe allocating information and determines corresponding uplink subframes and downlink subframes of the backhaul link, and communicates with the base station by the uplink subframes and the downlink subframes of the backhaul link;

wherein, the base station allocates the uplink subframe n as the uplink subframe of the backhaul link; and wherein the base station allocates the downlink subframe n−k1 and the downlink subframe set n−k2 as the downlink subframes of the backhaul link;

wherein, k1 is a HARQ (Hybrid Auto Repeat Request) timing between the downlink subframe of the uplink scheduling information sent from the base station and the uplink subframe of the corresponding uplink data sent from the relay node; k2 has many values and is the HARQ timing between the downlink subframe of the downlink data sent from the base station and the uplink subframe of the corresponding uplink ACKnowledge Character/Negative ACKnowledgement sent from the relay node.

* * * * *